United States Patent
Flynn et al.

(10) Patent No.: US 11,130,417 B2
(45) Date of Patent: Sep. 28, 2021

(54) CHARGING SYSTEM FOR ELECTRIC VEHICLE

(71) Applicant: KARMA AUTOMOTIVE LLC, Irvine, CA (US)

(72) Inventors: Jacques Flynn, Long Beach, CA (US); Andreas Thurner, Irvine, CA (US); Andre Franco Luis, Orange, CA (US)

(73) Assignee: KARMA AUTOMOTIVE LLC, Irvine, CA (US)

( * ) Notice: Subject to any disclaimer, the term of this patent is extended or adjusted under 35 U.S.C. 154(b) by 204 days.

(21) Appl. No.: 16/425,573

(22) Filed: May 29, 2019

(65) Prior Publication Data
US 2020/0324663 A1  Oct. 15, 2020

Related U.S. Application Data

(60) Provisional application No. 62/833,647, filed on Apr. 13, 2019.

(51) Int. Cl.
| *B60L 53/31* | (2019.01) |
| *B60L 53/60* | (2019.01) |
| *B60L 53/34* | (2019.01) |
| *B60L 53/55* | (2019.01) |
| *B60L 53/53* | (2019.01) |

(52) U.S. Cl.
CPC .............. *B60L 53/31* (2019.02); *B60L 53/34* (2019.02); *B60L 53/60* (2019.02); *B60L 53/53* (2019.02); *B60L 53/55* (2019.02)

(58) Field of Classification Search
CPC ........................................................ B60L 53/31
USPC ........................................................ 320/109
See application file for complete search history.

(56) References Cited

U.S. PATENT DOCUMENTS

| 10,202,046 | B2* | 2/2019 | Kohler | B60L 53/16 |
| 2011/0074351 | A1* | 3/2011 | Bianco | G07F 15/005 |
| | | | | 320/109 |
| 2012/0048983 | A1* | 3/2012 | Bianco | B60L 11/1818 |
| | | | | 242/388.9 |
| 2015/0183331 | A1* | 7/2015 | Yamamaru | B60L 53/11 |
| | | | | 701/22 |
| 2017/0129355 | A1* | 5/2017 | Fournier | H02G 11/003 |
| 2018/0229613 | A1* | 8/2018 | Rajaie | B60L 11/185 |

\* cited by examiner

*Primary Examiner* — Jerry D Robbins
(74) *Attorney, Agent, or Firm* — Gordon Rees Scully Mansukhani, LLP

(57) ABSTRACT

A charging system for an electric vehicle, comprising a charging station, a charging station stand, a charging cable held by the charging station stand, a charging plug, and a charging port of the electric vehicle. The charging cable is attached to a power source at its first end and to the charging plug at its second end. The charging cable is also retractable. The charging port is mounted on the topside of the electric vehicle and is designed to connect with the charging plug in a manner that keeps the charging cable clear of the floor and the surface of the electric vehicle.

8 Claims, 8 Drawing Sheets

CHARGING SYSTEM FOR ELECTRIC VEHICLE

CROSS-REFERENCE TO RELATED APPLICATIONS

The present application claims priority to and the benefit of U.S. Provisional Patent Application No. 62/833,647 filed on Apr. 13, 2019. The foregoing patent application is incorporated by reference herein in its entirety.

BACKGROUND

The present disclosure relates to a charging system for an electric vehicle.

While significant advances have been made in the field of electric-powered vehicles, the need for an external charging solution remains consistent. The most common external charging solution by far is a charging system including a charging station, a charging cable, a charging plug, and a charging port on the electric vehicle, wherein a user connects the charging plug to the charging port, and wherein the charging station conducts electricity along the charging cable to the charging plug and charging port. However, cable management solutions in this field are lacking. At present, the charging cables of common charging stations remain unmanaged and are likely to drag around the floor or the surface of a connected electric vehicle, thereby picking up dust or causing damage to the electric vehicle, respectively.

It is desirable to produce a charging system for an electric vehicle including a cable management system and a charging port for the electric vehicle that is optimized for such a system.

SUMMARY

Disclosed herein is a charging system for an electric vehicle. In one embodiment, the charging system for an electric vehicle includes a charging station and a charging port for the electric vehicle. In one embodiment, the charging station includes a charging station stand, a charging cable held by the charging station stand, and a charging plug. In one embodiment, a first end of the charging cable is connected to a power source. The charging cable may be retractable at the first end of the charging cable by means of a retraction mechanism. In one embodiment, the charging plug is connected to a second end of the charging cable. In one embodiment, the charging plug is configured to connect to the charging port of the electric vehicle. In one embodiment, the charging port for the electric vehicle is mounted on the topside of the electric vehicle. In one embodiment, the charging port is configured to accept a connection to the charging plug.

In another disclosed embodiment, the charging port is mounted on top of a deck lid at the rear of the electric vehicle. In another disclosed embodiment, the charging port is mounted on a roof of the electric vehicle. In another disclosed embodiment, the charging port is mounted below a spoiler of the electric vehicle.

In another disclosed embodiment, the charging port is concealed by a charging port cover when not in use.

In another disclosed embodiment, the charging station stand holds a portion of the charging cable at the top of the charging station stand by means of a pulley. In another disclosed embodiment, the retraction mechanism coils at least a portion of the charging cable within the structure of the charging station stand. In another disclosed embodiment, the retraction mechanism holds the charging cable in tension while the charging plug is connected to a charging port of an electric vehicle. In another disclosed embodiment, the charging station includes a socket to hold the charging plug in place when the charging station is not in use. In another disclosed embodiment, the retraction mechanism holds the charging cable in tension while the charging plug is held in place by the socket.

Other aspects, features, and techniques will be apparent to one skilled in the relevant art in view of the following detailed description of the embodiments.

BRIEF DESCRIPTION OF THE DRAWINGS

The features, objects, and advantages of the disclosed embodiments will become more apparent from the detailed description set forth below when taken in conjunction with the drawings in which like reference characters identify correspondingly throughout and wherein.

DETAILED DESCRIPTION

One aspect of the disclosure is directed to a charging system for an electric vehicle.

References throughout this document to "one embodiment," "certain embodiments," "an embodiment," or similar term mean that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. For example, two or more of the innovative devices described herein may be combined in a single device, but the application is not limited to the specific exemplary combinations of a charging system for an electric vehicle that are described herein.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

A detailed description of various embodiments is provided; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the disclosed embodiments.

Figure 1A:
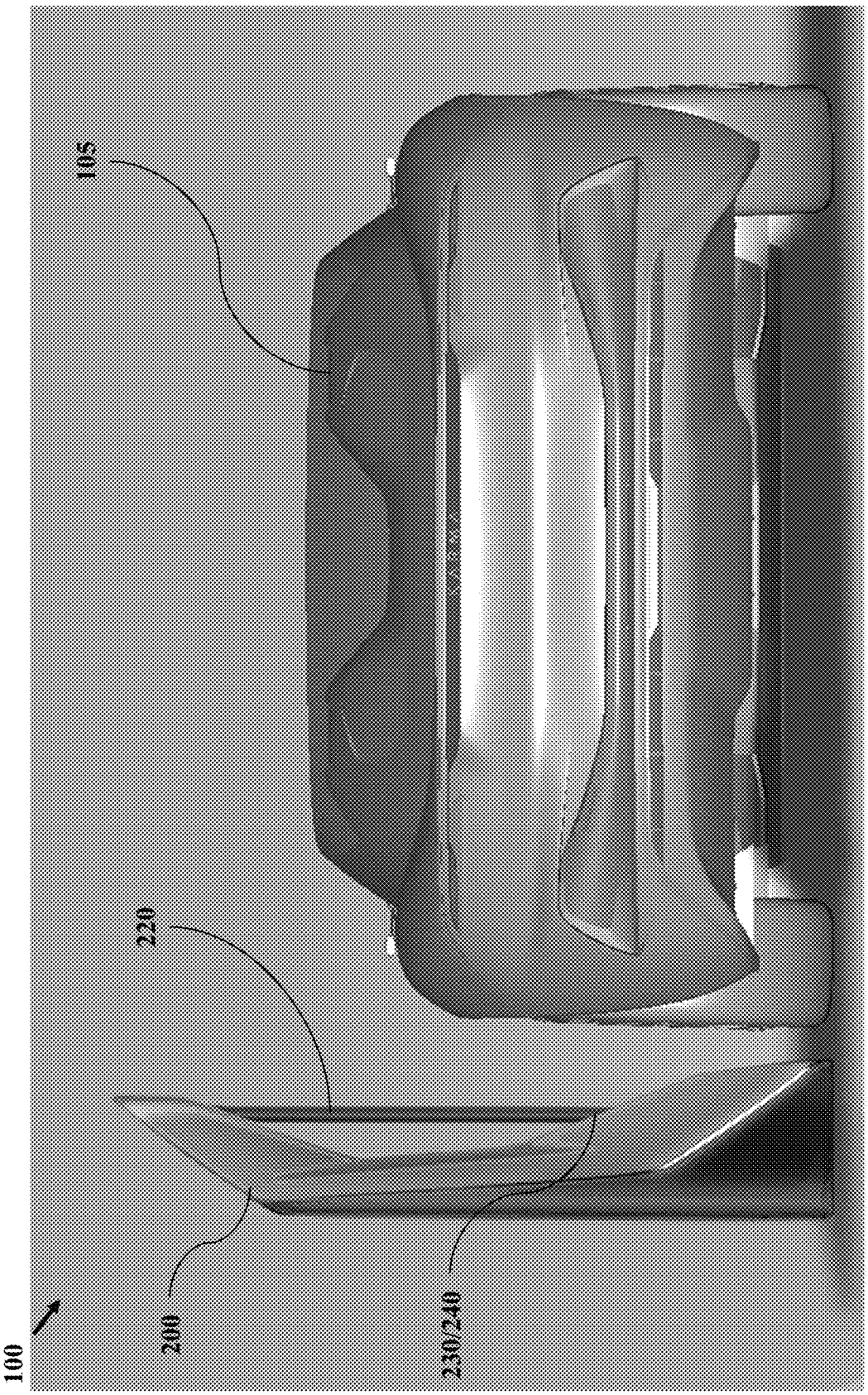
FIG. 1A is a rear view of an exemplary embodiment of a charging system including a charging station and an electric vehicle, wherein a charging cable of the charging station is stored in a socket.
Figure 1B:
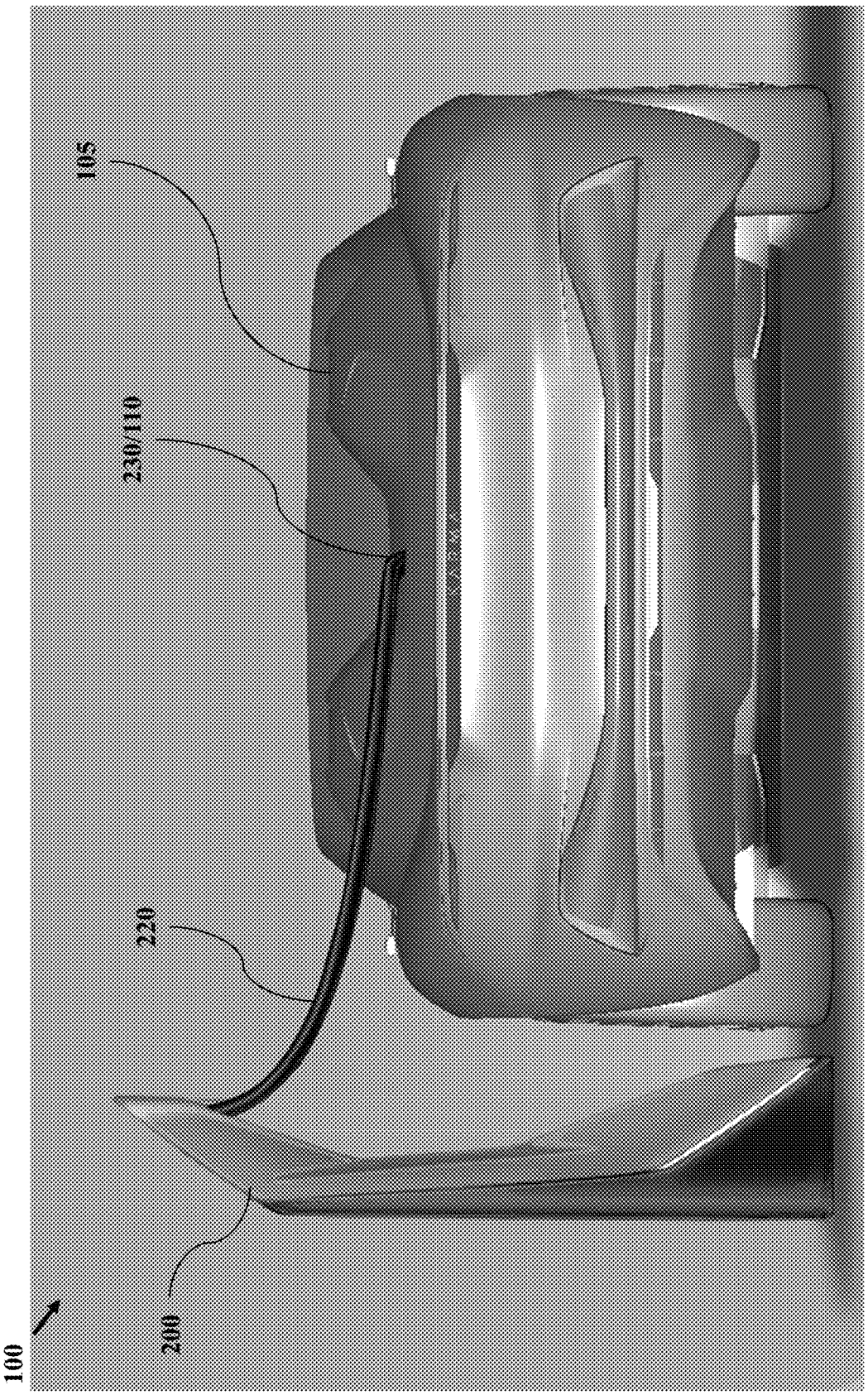
FIG. 1B is a rear view of an exemplary embodiment of a charging system including a charging station and an electric vehicle, wherein a charging cable of the charging station is connected to a charging port of the electric vehicle.

FIG. 1A is a rear view of an exemplary embodiment of a charging system 100 including a charging station 200 and an electric vehicle 105, wherein a charging cable 220 of the charging station 200 is stored in a socket 240. The vehicle includes a passenger compartment. FIG. 1B is a rear view of an exemplary embodiment of a charging system 100 including a charging station 200 and an electric vehicle 105, wherein a charging cable 220 of the charging station 200 is connected to a charging port 110 of the electric vehicle 105. The electric vehicle 105 is depicted as a sports vehicle, but the charging system 100 may be used with any electric vehicle. The electric vehicle includes a component for storing electric energy that may be used to power movement of the vehicle. The energy storage component may be a battery, capacitor or other suitable device. The movement of the vehicle may be powered by an electric motor such as a permanent magnet motor.

According to one embodiment, the charging station 200 includes a charging cable 220. The charging cable 220 may be retractable. A first end of the charging cable 220 may be connected to a power source, while a charging plug 230 may be attached to a second end of the charging cable 230. When not connected to an electric vehicle 105, the charging plug 230 may be stored in a socket 240 at the base of the charging station 200.

Figures 2A, 2B:
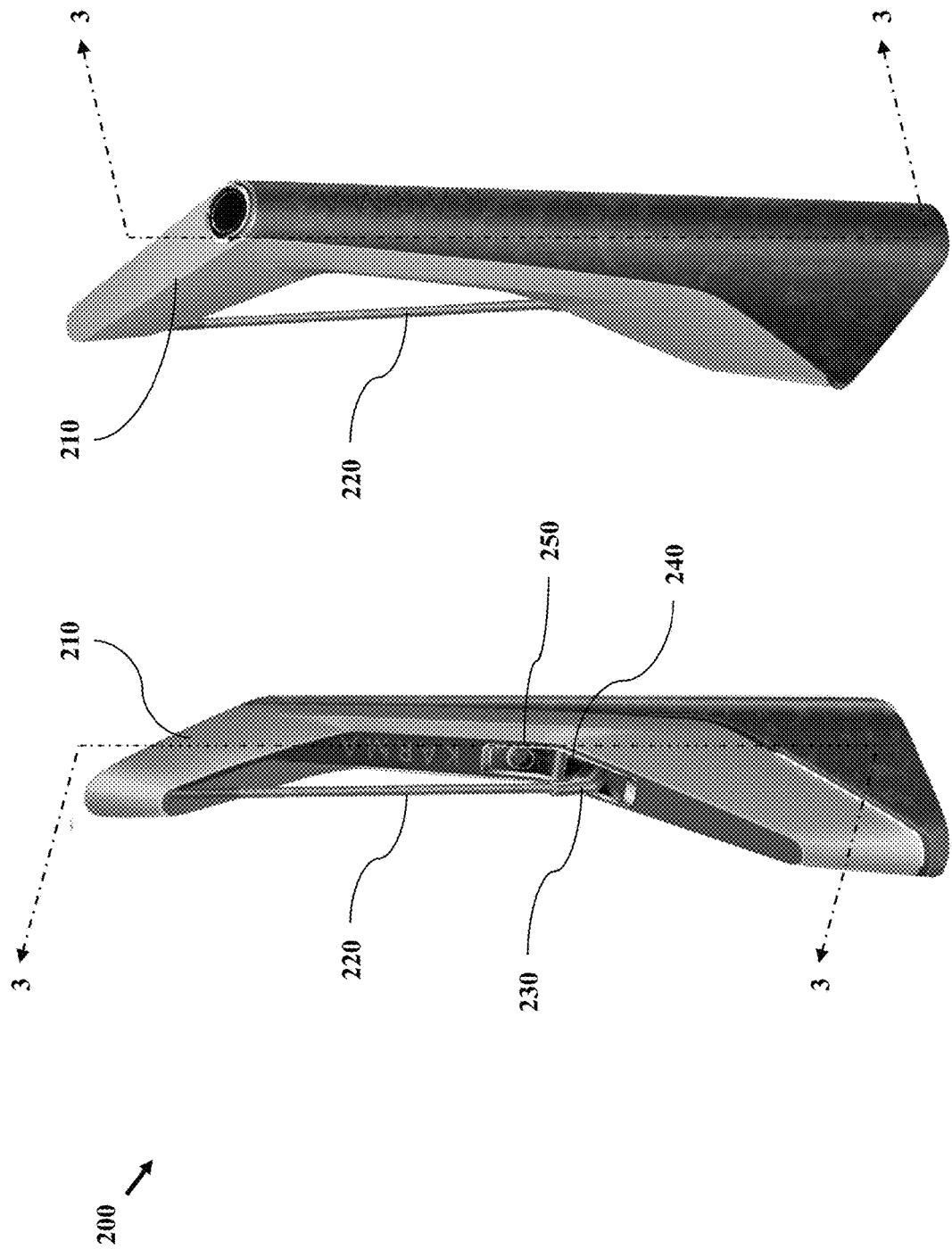
FIG. 2A is a front perspective view of an exemplary embodiment of a charging station for a charging system.
FIG. 2B is a rear perspective view of an exemplary embodiment of a charging station for a charging system.

FIG. 2A is a front perspective view of an exemplary embodiment of a charging station 200 for a charging system 100. FIG. 2B is a rear perspective view of an exemplary embodiment of a charging station 200 for a charging system 100. According to one embodiment, the charging station 200 comprises a charging station stand 210, a charging cable 220, a charging plug 230, a socket 240, and a status display 250. A first end of the charging cable 220 may be connected to the charging station stand 210. The charging plug 230 may be connected to a second end of the charging cable 220. When not in use, the charging plug 230 may rest inside the socket 240. The status display 250 may display information regarding the charging station 200, such as, for example, the current charge level of a connected electric vehicle 105, the current rate of charge, and the estimated amount of time needed to reach a full charge.

Figure 3:
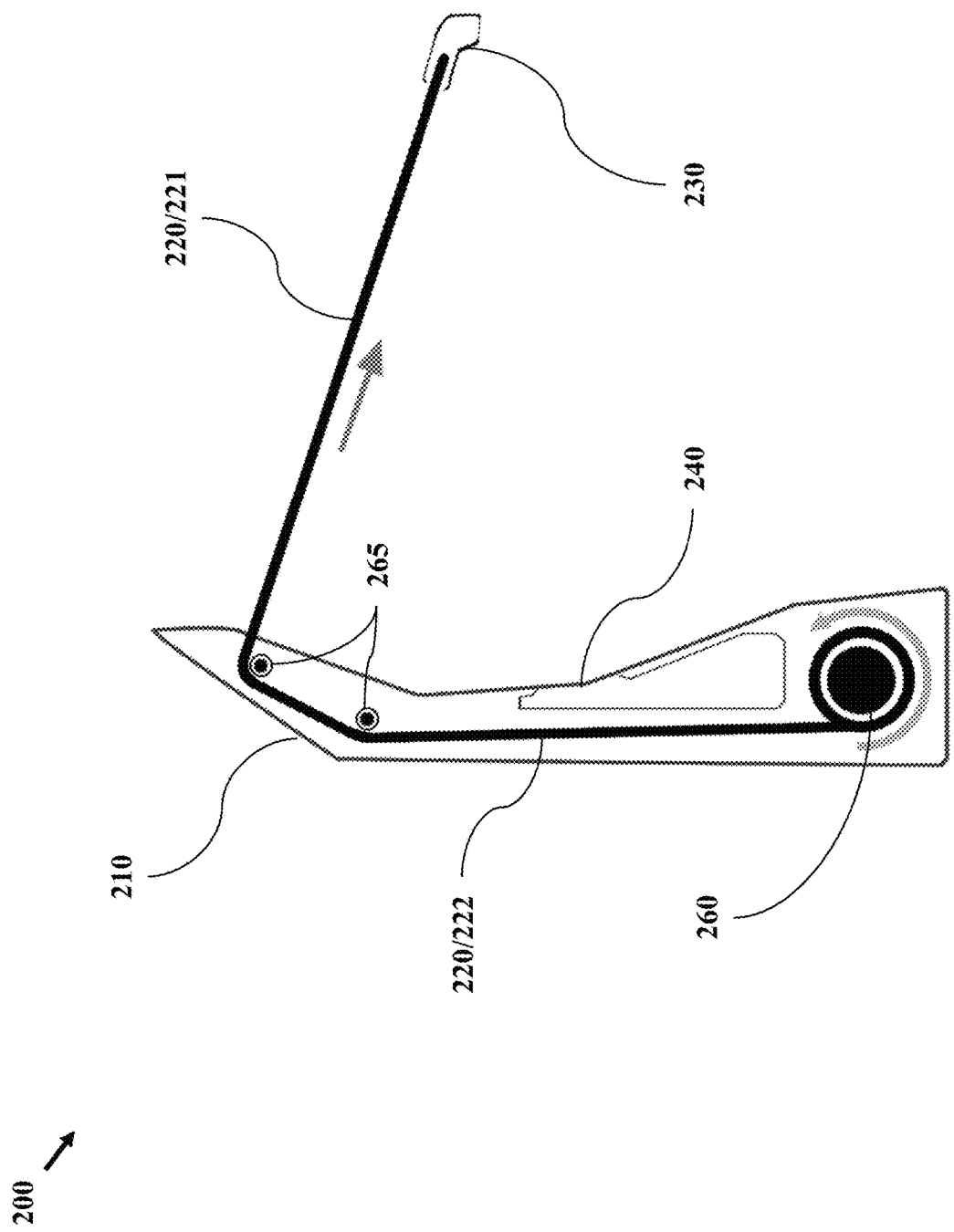
FIG. 3 is a side sectioned view of an exemplary embodiment of a charging station for a charging system, taken along the line 3-3.

FIG. 3 is a side sectioned view of an exemplary embodiment of a charging station 200 for a charging system 100, taken along the line 3-3. In addition to the components described above, the charging station may further comprise a retraction mechanism 260 and at least one pulley 265. The retraction mechanism 260 and the at least one pulley 265 may be kept within the structure of the charging station stand 210 and may not be visible to outside observers. The at least one pulley 265 may divide the charging cable 220 into a working cable section 221 and a retracted cable section 222.

According to one embodiment, the retraction mechanism 260 may coil at least a portion of the retracted cable section 222 within the structure of the charging station stand 210. The retraction mechanism 260 may hold the charging cable 220 in tension while the charging plug 230 is either connected to an electric vehicle 105 or held in place by the socket 240. In one embodiment, the at least one pulley 265 may direct at least a portion of the charging cable 220 to a position at the top of the charging station stand 210 and well above the floor and the height of the socket 240 and any possible charging port 110 of an electric vehicle 105. In this manner, the charging station 200 may keep the charging cable 220 clear of the floor and reduce the possibility of the charging cable 220 either gathering dust by dragging around the floor or the possibility of the charging cable 220 dragging around the surface of the electric vehicle 105 and scratching the electric vehicle 105.

In alternative embodiments, the charging cable can deploy directly downward from a roof of a vehicle parking structure or containment building, such as a garage for example. The charging cable could be incorporated directly into the structure of the containment building and be configured to automatically deploy and mate with a charging port on the vehicle with the charging cable and plug descending to connect or mate with the charging port and ascending when charging is no longer desired or completed.

Figure 4A:
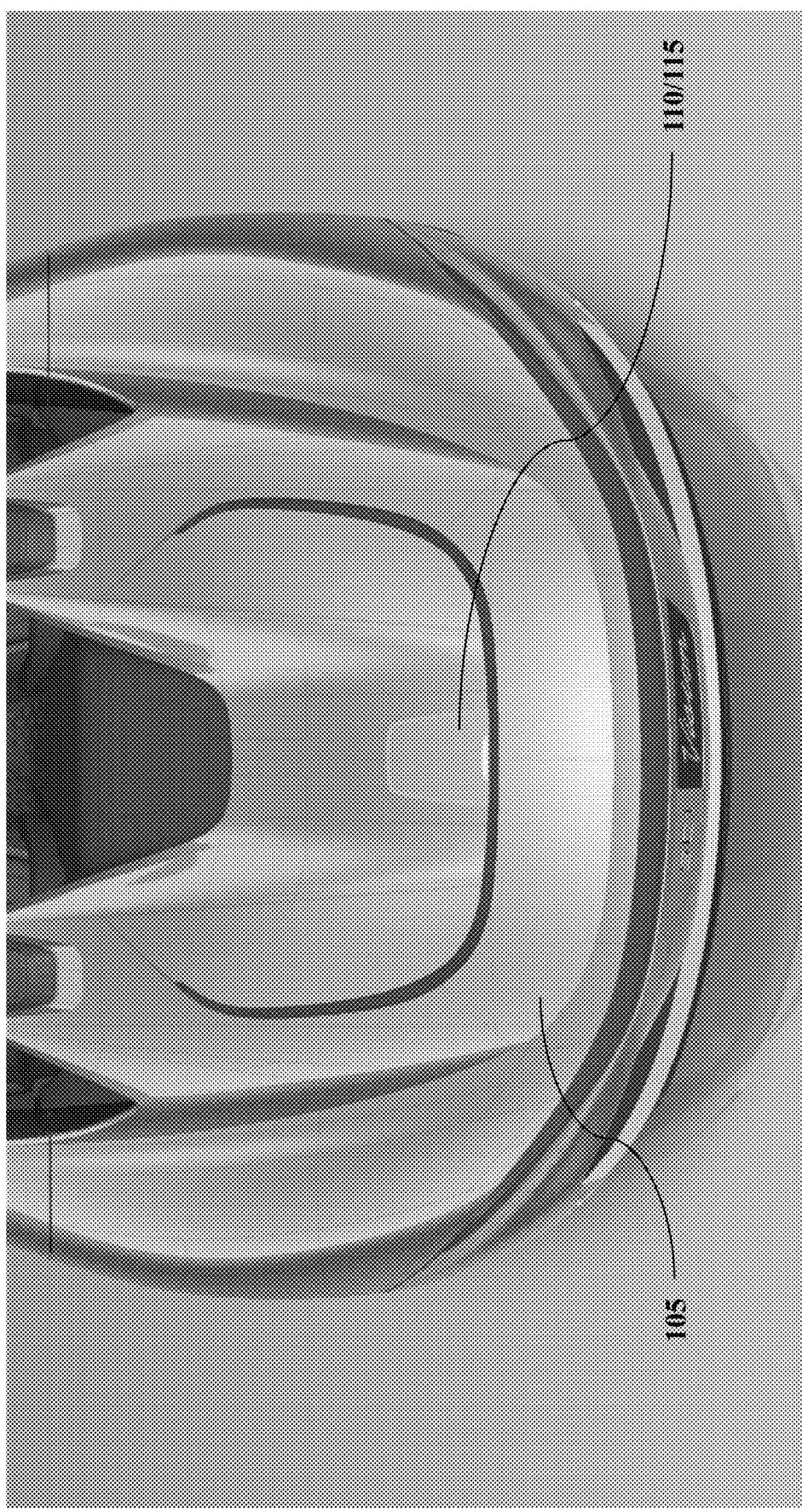
FIG. 4A is a top view of an exemplary embodiment of a charging port for an electric vehicle, wherein a cover of the charging port is in a closed position.
Figure 4B:
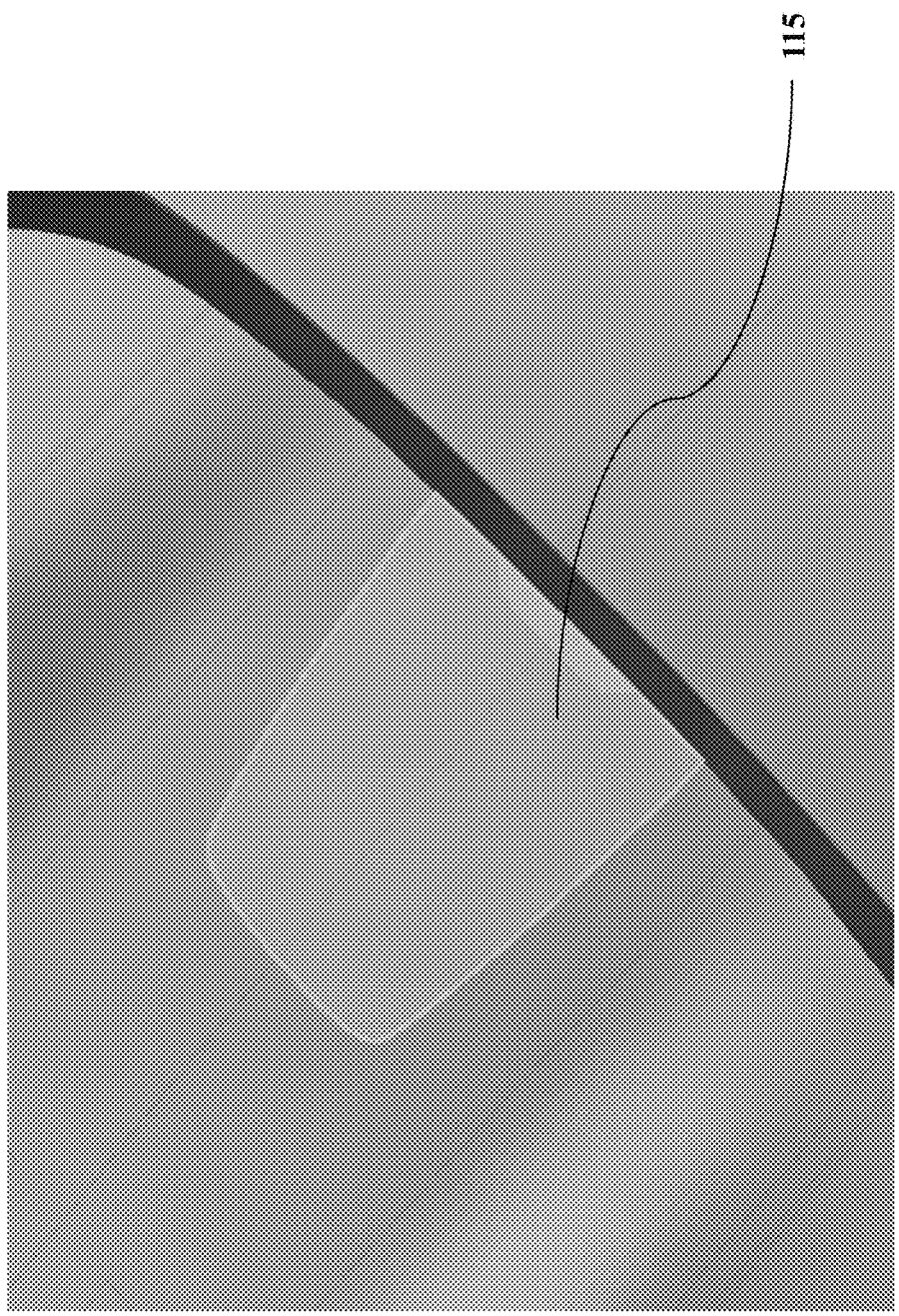
FIG. 4B is a perspective view of an exemplary embodiment of a charging port for an electric vehicle, wherein a cover of the charging port is in a closed position.

FIG. 4A is a top view of an exemplary embodiment of a charging port 110 for an electric vehicle 105, wherein a cover 115 of the charging port is in a closed position. When open, the cover 115 provides access to the charging port through an opening. FIG. 4B is a perspective view of an exemplary embodiment of a charging port 110 for an electric vehicle 105, wherein a cover 115 of the charging port is in a closed position. The charging port 110 may be mounted on the topside of the electric vehicle 105 and may further be configured to accept a connection to the charging plug 230 described above.

According to one embodiment, the charging port 110 is mounted on top of a deck lid at the rear of the electric vehicle 105. The charging port 110 may alternatively be mounted on a roof of the electric vehicle 105. The charging port may be mounted on any top service of the exterior body of the vehicle. For example, for a vehicle including a battery mounted in the front of the vehicle, the preferred location for the charging port may be under an opening in the hood of the vehicle. The power received from charging station via the charging cable is directed from the charging port to the propulsion device for the vehicle and or to the energy storage component (e.g., the battery). The opening may be located in a portion of the vehicle forward of the passenger compartment such as the hood. The opening may be located in a portion of the body of the vehicle aft of the passenger compartment, such as the deck lid or trunk.

According to one embodiment, the charging port 110 is concealed and protected by a charging port cover 115 when not in use.

Figure 5:
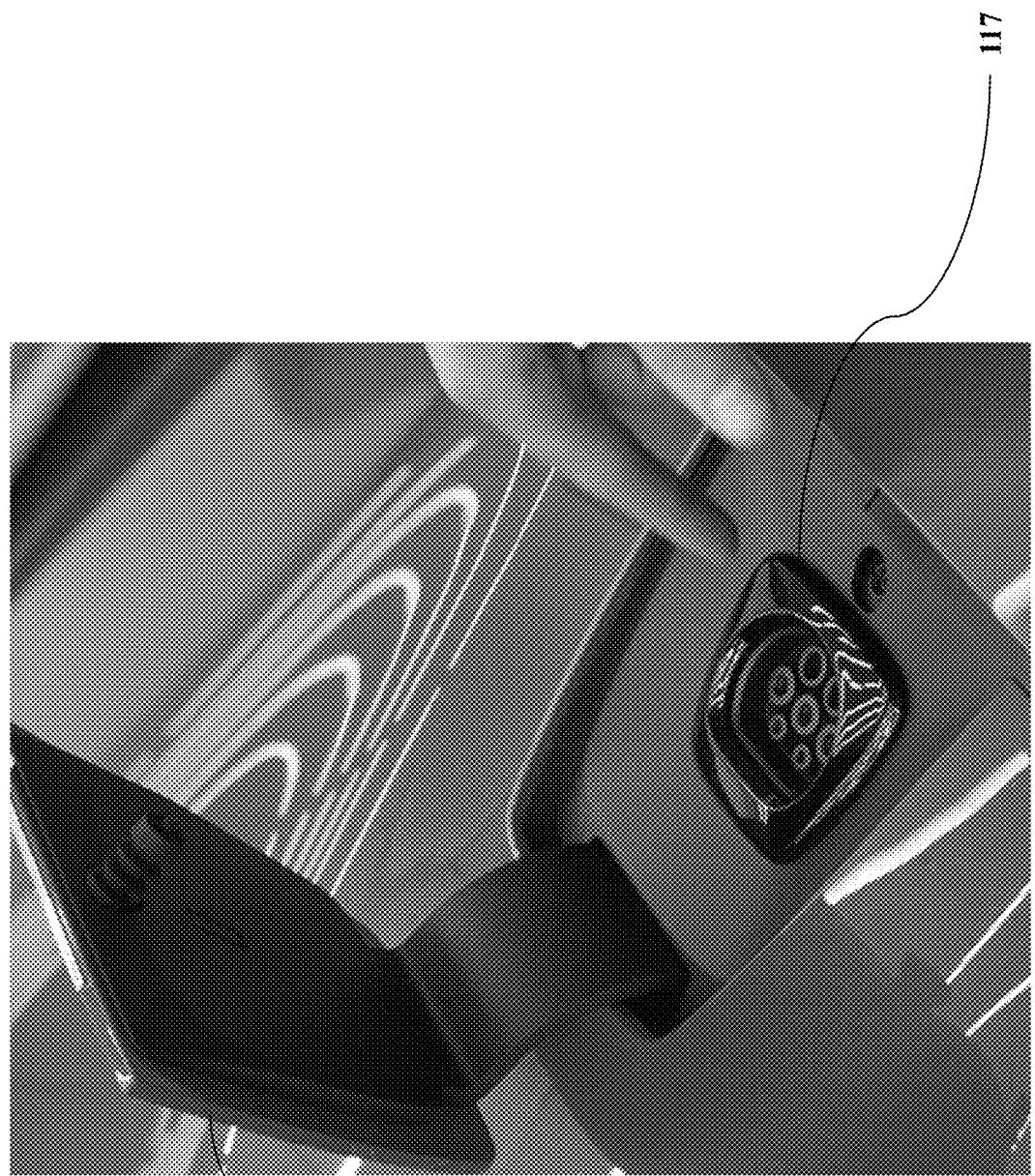
FIG. 5 is a perspective view of an exemplary embodiment of a charging port for an electric vehicle, wherein a cover of the charging port is in an open position.

FIG. 5 is a perspective view of an exemplary embodiment of a charging port 110 for an electric vehicle 105, wherein a cover 115 of the charging port is in an open position. In one embodiment, the charging port 110 may include an inlet 117 that is designed to receive a charging plug 230. The inlet 117 is depicted as a "Type 2" female connector, but the inlet 117 may be any type of a plurality of types of inlets. In one embodiment, an owner of the electric vehicle 105 may be provided with one or more inlet adapters to allow the inlet 117 to connect with a plurality of types of charging plugs. In one embodiment, the charging port 110 may include a plurality of inlets 117 to allow the inlets 117 to connect with a plurality of types of charging plugs.

Figure 6:
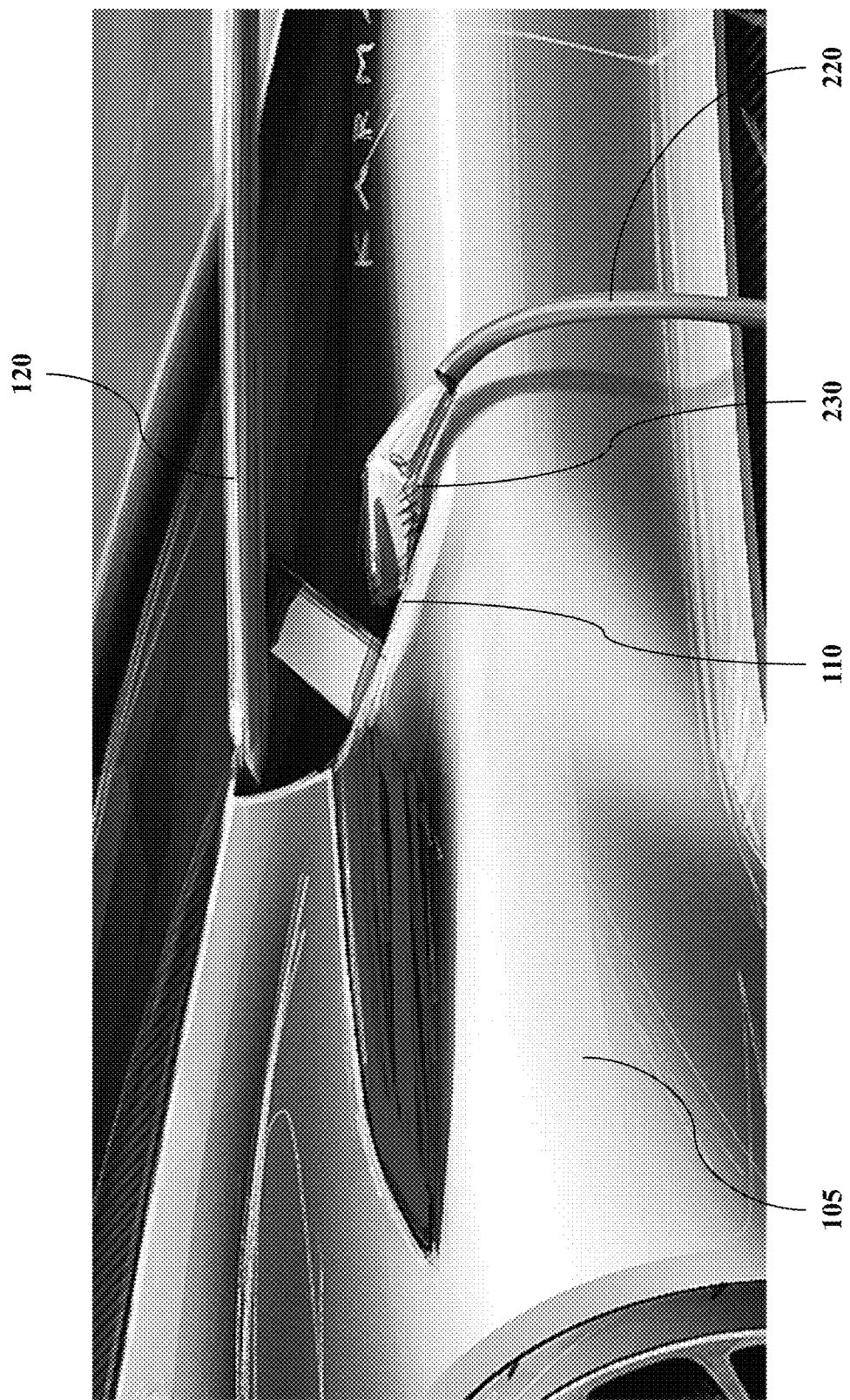
FIG. 6 is a rear-left orthogonal view of an exemplary embodiment of a charging port for an electric vehicle, wherein a charging plug is connected to the charging port, and wherein the charging port is mounted below a spoiler of the electric vehicle.

FIG. 6 is a rear-left orthogonal view of an exemplary embodiment of a charging port 110 for an electric vehicle 105, wherein a charging plug 230 is connected to the charging port 110, and wherein the charging port 110 is mounted below a spoiler 120 of the electric vehicle 105. Notably, the charging cable 220 depicted in this exemplary embodiment does not contact the surface of the electric vehicle 105.

While this disclosure makes reference to exemplary embodiments, it will be understood by those skilled in the art that various changes in form and details may be made therein without departing from the scope of the claimed embodiments.

What is claimed is:

1. A charging system for an electric vehicle, comprising:
    a charging station, wherein the charging station comprises:
    a charging station stand,
    a charging cable held by the charging station stand, wherein a first end of the charging cable is connected to a power source and wherein the charging cable is retractable by means of a retraction mechanism, and
    a charging plug connected to a second end of the charging cable, wherein the charging plug is configured to connect to a charging port of an electric vehicle; and
    a charging port for the electric vehicle, wherein the charging port is mounted on a roof of the electric vehicle, and wherein the charging port is configured to accept a connection to the charging plug which automatically deploys downwardly from a roof of a vehicle parking structure.

2. The charging system of claim 1, wherein the charging port is concealed by a charging port cover when not in use.

3. The charging system of claim 1, wherein the charging station stand holds a portion of the charging cable at the top of the charging station stand by means of a pulley.

4. The charging system of claim 1, wherein the retraction mechanism coils at least a portion of the charging cable within the structure of the charging station stand.

5. The charging system of claim 1, wherein the retraction mechanism holds the charging cable in tension while the charging plug is connected to a charging port of an electric vehicle.

6. The charging system of claim 1, wherein the charging station includes a socket to hold the charging plug in place when the charging station is not in use.

7. The charging system of claim 6, wherein the retraction mechanism holds the charging cable in tension while the charging plug is held in place by the socket.

8. A battery powered vehicle configured to travel on a road or other suitable surface comprising:
    a battery and an electric motor for providing propulsive power for the vehicle;
    an exterior body covering a vehicle passenger compartment and the motor and the battery;
    a charging port for mating with a charging plug connected to a charging cable for providing electrical power to charge the battery;
    wherein the exterior body includes an opening through which the charging plug may pass to mate with the charging port, and wherein the opening is located in a a roof surface of the exterior body so that the charging cable can deploy directly downward from above the vehicle from a location on the roof of a vehicle parking structure to allow the charging plug to mate with the charging port without the cable making contact with the surface surrounding the vehicle.

* * * * *